United States Patent [19]

Iwaki

[11] Patent Number: 4,594,631
[45] Date of Patent: Jun. 10, 1986

[54] TEMPERATURE PROTECTIVE CIRCUIT FOR A CHARGING GENERATOR

[75] Inventor: Yoshiyuki Iwaki, Himeji, Japan

[73] Assignee: Mitsubishi Denki Kabushiki Kaisha, Tokyo, Japan

[21] Appl. No.: 618,785

[22] Filed: Jun. 8, 1984

[30] Foreign Application Priority Data

Jun. 28, 1983 [JP] Japan .................. 58-101879
Jun. 28, 1983 [JP] Japan .................. 58-101880
Jun. 28, 1983 [JP] Japan .................. 58-101881

[51] Int. Cl.[4] .............................................. H02H 7/06
[52] U.S. Cl. ......................................... 361/20; 322/33
[58] Field of Search ................. 322/33, 99, 22, 34, 322/68; 361/18, 20, 21, 103, 106; 320/35, 36, 64

[56] References Cited

U.S. PATENT DOCUMENTS 3,643,153  2/1972  Hanson et al. ..................... 322/33
3,697,807  10/1972  Christ ................................ 361/21
3,938,005  2/1976  Cummins ............................ 361/21

Primary Examiner—A. D. Pellinen
Attorney, Agent, or Firm—Sughrue, Mion, Zinn, Macpeak, and Seas

[57] ABSTRACT

A charging generator system including a protective circuit which prevents the generator system from overheating when the ambient temperature is extraordinarily high. A protective shorting circuit is coupled between a rectifier output terminal supplying the field coil of the generator and the ground terminal. The protective shorting circuit has a high resistance for normal temperatures and a low resistance for high temperatures, thereby to interrupt the current flow in the field coil when high temperatures occur. In one embodiment, the protective shorting circuit means is implemented with a single thermistor. In another embodiment, a protective transistor is coupled to the field coil, and base current is supplied to the protective transistor when the temperature rises above a predetermined level to thereby shut off the current flow through the field coil under such conditions.

4 Claims, 8 Drawing Figures

TEMPERATURE PROTECTIVE CIRCUIT FOR A CHARGING GENERATOR

BACKGROUND OF THE INVENTION

The present invention relates to a charging generator system including a protective circuit for vehicular use.

A circuit diagram of such a conventional charging generator system of this type is shown in FIG. 1. In this figure, reference numeral 1 designates three-phase stator coils, 2, a field coil; 3, a rectifier circuit; 4, a first output terminal of the rectifier circuit; 5, a second output terminal of the rectifier circuit; and 6, a charging generator composed of the elements described above. Also in FIG. 1, reference numeral 7 designates a transistor for switching the current in the field coil 2; 8 a transistor which detects the voltage at the second output terminal 5 of the rectifier circuit and in response controllably drives the transistor 7; $D_1$ and $D_2$ diodes; $R_1$, $R_2$ and $R_3$ resistors; and 9 a regulator circuit which is composed of the elements described above. Further in FIG. 1, reference numeral 10 designates a charge display lamp; 11, a keyswitch; and 12, a battery.

The operation of the above-described conventional system will now be described.

When the keyswitch 10 is closed, current flows from the battery 12 through the charge display lamp 10, the field coil 2 and the transistor 7, to thus turn on the charge display lamp 10 and excite the field coil 2. Thereafter, when an engine (not shown) is started and the charging generator 6 is driven, power generation is started. As a result, voltages appear at the first and second rectifier output terminals 4 and 5, respectively, and the battery 12 is charged thereby. Thereafter, when the voltages at the terminals of the charge display lamp 10 become substantially equal to each other, the charge display lamp 10 is turned off and the current of the field coil 2 is supplied directly from the second rectifier output terminal 5.

It is generally true that overheating of the three-phase stator coils or fusing of the soldered joints in the rectifier circuit or the regulator will not occur under normal full-load conditions of the charging generator 6 if the ambient temperature of the generator 6 is lower than about 120° C.

However, in the conventional charging generator system, the peripheral temperature thereof may sometimes exceed 140° C. due to a lack of a cooling water or when climbing very steep slopes or an extraordinarily high atmospheric temperature. Under these circumstances, overheating of the coils of the charging generator or fusing of the soldered joints in the rectifier circuit or the regulator may occur, which causes the charging generator to be incapable of power generation.

Accordingly, it is an object of the present invention to provide a charging generator system including a protective circuit in which the above-mentioned difficulties accompanying a conventional charging generator system are eliminated.

SUMMARY OF THE INVENTION

The above-mentioned and other objects are achieved by a charging generator system including a protective circuit of the present invention. Specifically, the system of the invention includes a protective shorting circuit coupled between the second rectifier output terminal and the ground terminal of the conventional system. The protective shorting circuit has a high resistance under normal temperatures and a low resistance under high temperatures. Therefore, the protective shorting circuit has no influence upon the operation of the conventional circuit in the normal temperature range since it conducts only a very small amount of current in such a temperature range. However, for extraordinarily high temperatures, the protective shorting circuit operates to interrupt the current in the field coil to thus cease the power generation of the charging generator. As a result, the rise of the temperatures within the system is limited, and hence overheating of the coils and fusing of soldered joints are effectively avoided.

In a preferred embodiment of the invention, the protective circuit is implemented with a thermistor. In other embodiments of the invention, the protective circuit includes a protective shorting transistor, a voltage divider including a series connection of a thermistor or a posistor and a resistor, and includes a Zener diode coupled between the output terminal of the voltage divider and the control electrode of the protective shorting transistor. At a predetermined high temperature, the Zener diode and the protective shorting transistor are rendered conductive to thus interrupt the field current.

DESCRIPTION OF THE PREFERRED EMBODIMENTS

Figure 1:
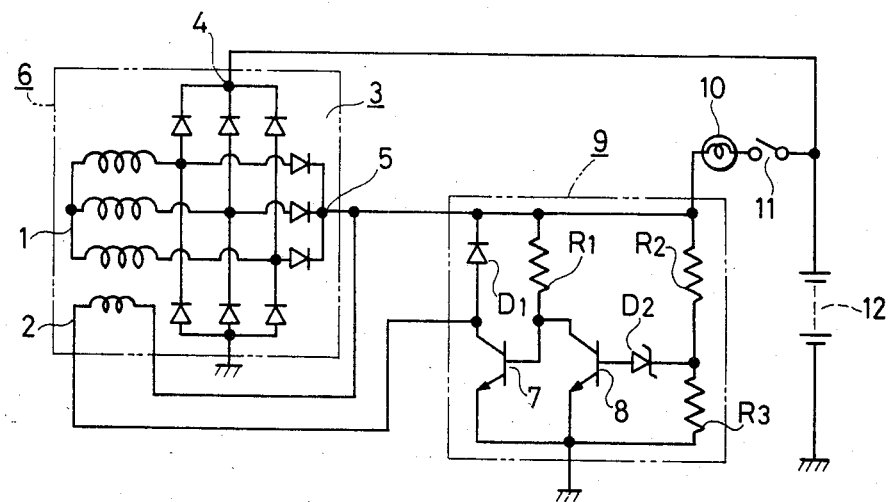
FIG. 1 is a schematic diagram showing a prior art charging generator system of the same general type to which the invention pertains.
Figure 2:
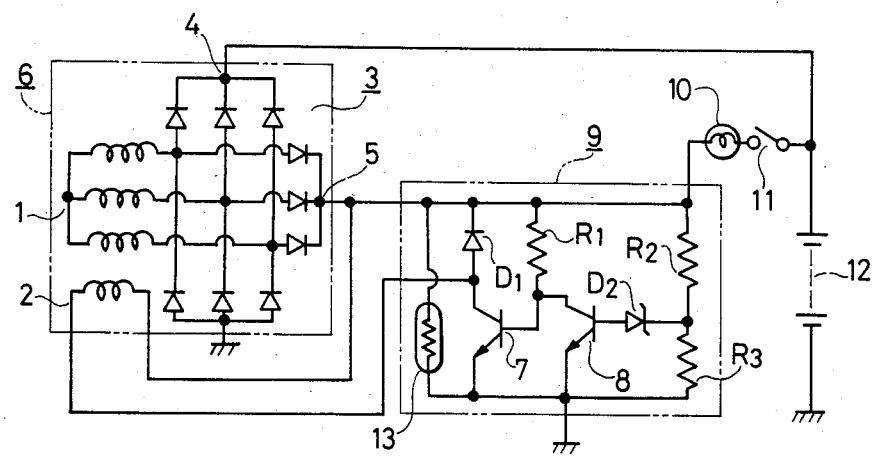
FIGS. 2, 4, 5, 6 and 8 are schematic diagrams of first through fifth embodiments, respectively, of a charging generator system of the invention.

A circuit diagram of a first preferred embodiment of the present invention is shown in FIG. 2. In this figure, reference numerals used in common with FIG. 1 designate like components, and hence detailed descriptions thereof will be omitted. In FIG. 2, reference numeral 13 designates a thermistor having a negative temperature coefficient such as shown in FIG. 3.

In the circuit of FIG. 2, if the second rectifier output terminal 5 is grounded, the series connection of the field coil 2 and transistor 7 will be shorted, which causes the current flow in the field coil 2 to cease. As a result, the excitation of the field coil 2 is lost so that the power generation of the charging generator 6 is interrupted and the charge display lamp is turned on.

Figure 3:
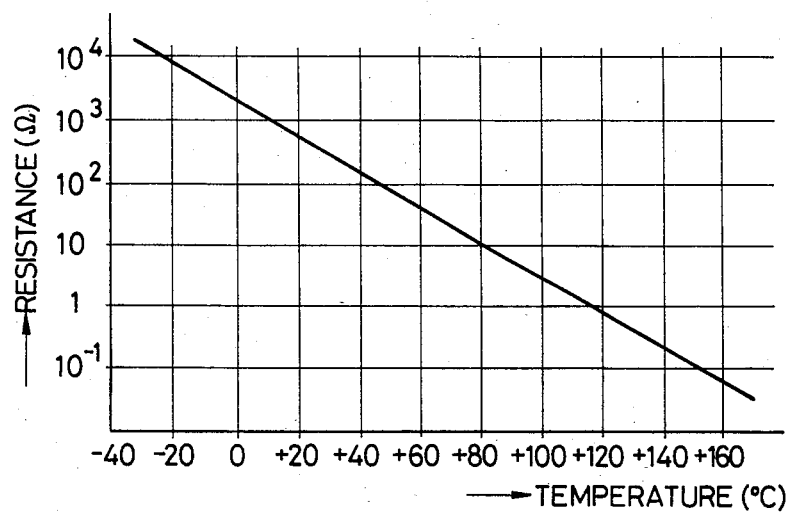
FIG. 3 is a characteristic curve showing a relation between the resistance and temperature of a thermistor used in the embodiments of FIGS. 2, 4 and 5.

The thermistor 13, which is connected between the second rectifier terminal 5 and the ground terminal, has a high resistance in a normal temperature range and a low resistance under extraordinarily high temperatures as shown in FIG. 3. Therefore, the thermistor 13 has no influence upon the operation of the remaining portions of the circuit in the normal temperature range. However, it shorts the series connection of the field coil 2 and the transistor 7 when extraordinarily high temperatures are present to thus interrupt the power generation of the charging generator 6.

Although the thermistor 13 is physically located within the regulator 9 in the embodiment of FIG. 2, it may be placed anywhere within the charging generator 6 where it can readily respond to the ambient temperature.

As described above, according to the first embodiment of the present invention, faults during high-temperature conditions are avoided since the current in the field coil is interrupted to cease power generation due to the shorting operation of the thermistor.

Figure 4:
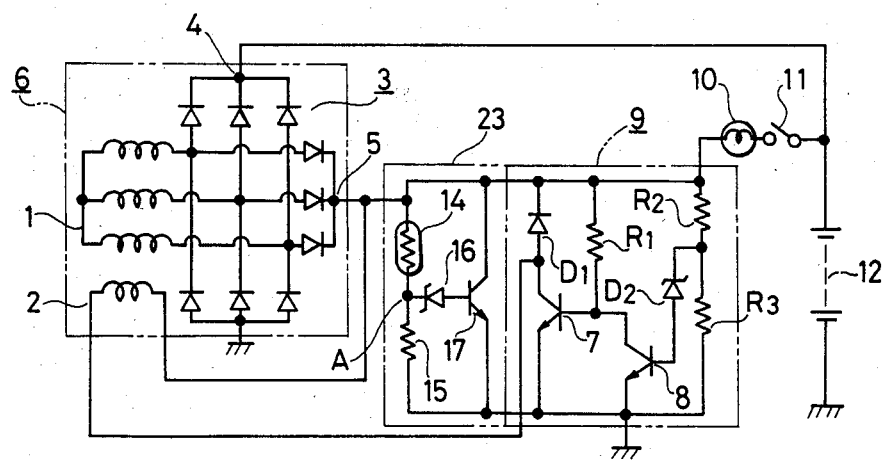

A circuit diagram of a second preferred embodiment of a charging generator system of the present invention is shown in FIG. 4. In this figure, reference numerals used in common with FIGS. 1 and 2 designate like components, and hence detailed descriptions thereof will be omitted. In FIG. 4, reference numeral 23 designates a shorting circuit which includes a thermistor 14, a resistor 15, a Zener diode 16 and an NPN transistor 17.

The thermistor 14 has a high resistance in a normal temperature range and a low resistance for extraordinarily high temperatures as shown in FIG. 3. Therefore, the shorting circuit 23 has no influence upon the operation of the other portions of the circuit when operating in a normal temperature range since the transistor 17 remains nonconductive in such a temperature range. However, for extraordinarily high temperatures, the potential at node A increases until the point that the Zener diode 16 is rendered conductive to thus supply base current of the NPN transistor 17. Therefore, the NPN transistor 17 is rendered conductive to substantially short circuit the series connection of the field coil 2 and the transistor 7. As a result, power generation of the charging generator is interrupted to limit the rise of the temperature thereof.

Figure 5:
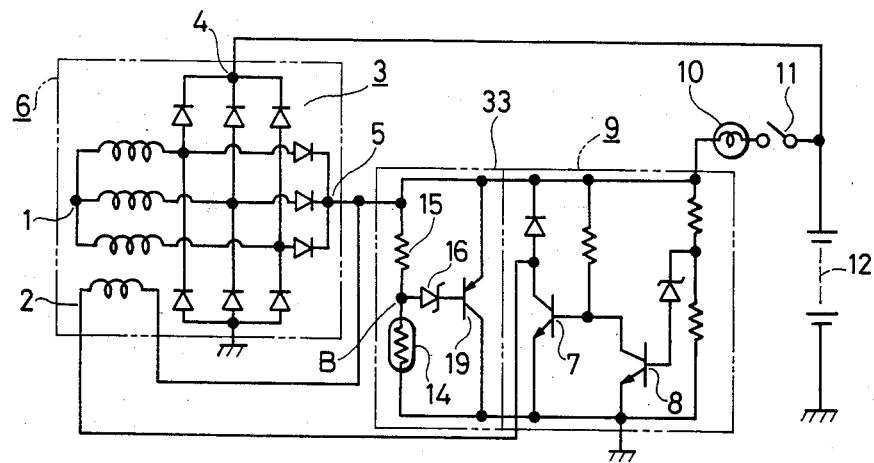

A circuit diagram of a third preferred embodiment of the present invention is shown in FIG. 5. In this figure, reference numeral 33 designates a shorting circuit. In the shorting circuit 33, the NPN transistor 17 in FIG. 4 is replaced by a PNP transistor 19, and the thermistor 14 and the resistor 15 are exchanged in position as compared with the arrangement of FIG. 4.

The shorting circuit 33 has no influence upon the operation of the remaining portions of the circuit for the normal temperature range since the transistor 19 remains nonconductive in such a temperature range. However, for extraordinarily high temperatures, the potential at node B increases until the point that the Zener diode 16 is rendered conductive, thus supplying base current to the PNP transistor 19. Therefore, the PNP transistor is rendered conductive to substantially short circuit the series connection of the field coil 2 and the transistor 7. As a result, the same protecting operation as attained by the circuit of FIG. 4 is achieved.

Figure 6:
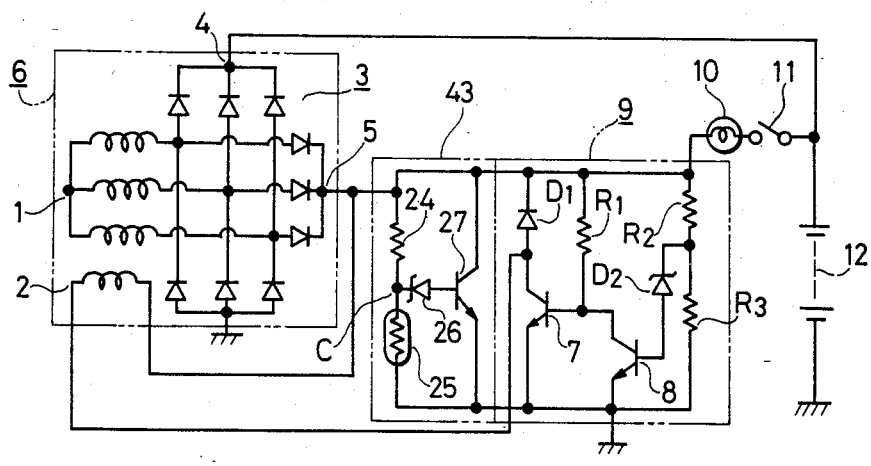

FIG. 6 shows a circuit diagram of a fourth preferred embodiment of a charging generator system of the present invention. In FIG. 6, reference numeral 43 designates a shorting circuit including a resistor 24, a resistor 25, a Zener diode 26 and an NPN transistor 27. In this figure, reference numerals used in common with FIGS. 1, 2 and 4 through 6 designate like components.

Figure 7:
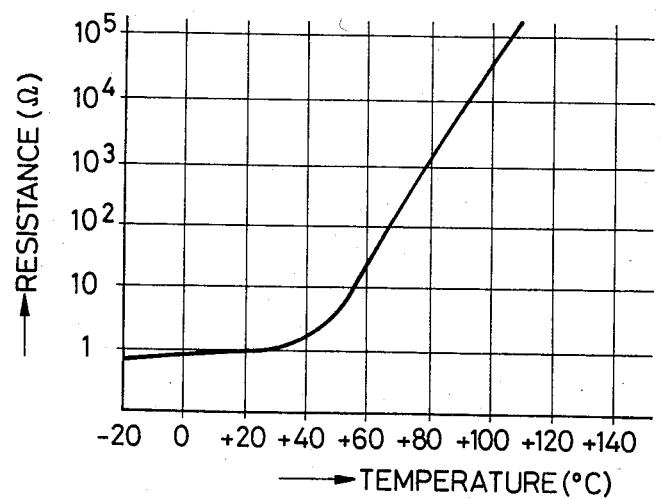
FIG. 7 is a characteristic curve showing a relation between the resistance and temperature of a posistor used in the embodiments of FIGS. 6 and 8.

The posistor 25 has a low resistance under a normal temperature range and a high resistance for extraordinarily high temperatures as shown in FIG. 7. Therefore, the shorting circuit 43 does not operate for the normal temperature range since the potential at node C remains low and the NPN transistor 27 does not conduct. However, for extraordinarily high temperatures, the potential at node C increases with the resistance of the posistor 25 to cause the Zener diode 26 and the NPN transistor 27 to conduct. As a result, the same protecting operation as provided by the circuits of FIGS. 2, 4 and 5 is attained.

Figure 8:
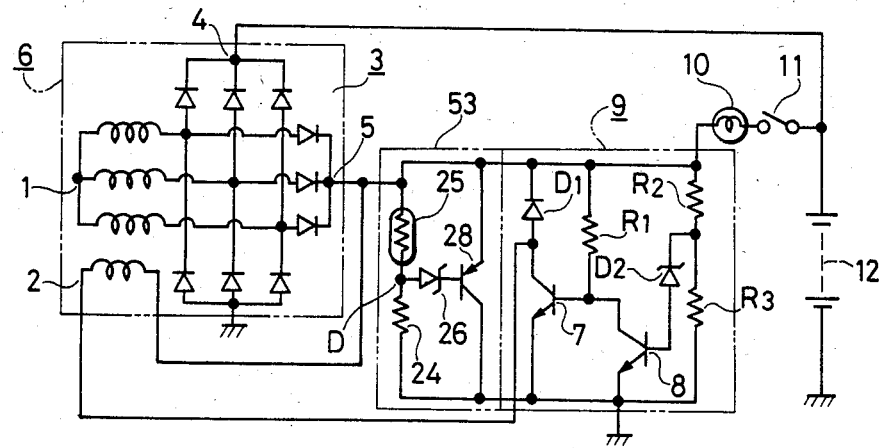

A circuit diagram of a fifth preferred embodiment of the present invention is shown in FIG. 8. In FIG. 8, reference numeral 53 designates a shorting circuit wherein the NPN transistor 27 in FIG. 6 is replaced by a PNP transistor 28, and the resistor 24 and the posistor 25 are exchanged in position with reference to the arrangement in FIG. 6.

The shorting circuit 53 does not operate under normal temperatures since the potential at node D remains high and the PNP transistor 28 hence does not conduct. The potential at node D decreases with an increase in resistance of the posistor 25 under extraordinarily high temperatures so that the Zener diode 26 and the PNP transistor 28 are rendered conductive. In this manner, the same protecting operation as provided by the circuits of FIGS. 2, 4, 5 and 6 is attained.

I claim:

1. A charging generator system comprising:
 a charging generator having field and armature coils;
 rectifier means for rectifying AC outputs induced in said armature coils of said charging generator, said rectifier means having first and second rectifier output terminals and a ground terminal, a first terminal of said field coil being coupled to said second rectifier output terminal;
 a battery coupled directly to said first rectifier output terminal and also coupled through a keyswitch and charge display lamp to said second rectifier output terminal;
 voltage regulator means comprising a switching transistor coupled between a second terminal of said field coil and said ground terminal, said voltage regulator means selectively driving said switching transistor to thereby control current flow in said field coil to maintain an output voltage of said charging generator at a predetermined value; and
 protective shorting circuit means coupled between said second rectifier output terminal and said ground terminal, said protective shorting circuit means having a high resistance under normal temperatures and a low resistance under high temperatures to thereby interrupt said current flow in said field coil under said high temperatures.

2. The charging generator system according to claim 1, wherein said protective shorting circuit means comprises a single thermistor.

3. The charging generator system according to claim 1, wherein said protective circuit comprises:
 a protective transistor having main electrodes and a control electrode, said main electrodes being coupled respectively to said second rectifier output terminal and said ground terminal;
 a voltage divider comprising a series connection of a thermistor and a resistor and having input terminals coupled between said second rectifier output terminal and said ground terminal, said voltage divider having an output terminal; and
 a Zener diode coupled between said output terminal of said voltage divider and said control electrode of said protective transistor to supply base current to said protective transistor at a predetermined high temperature.

4. The charging generator system according to claim 1, wherein said protective circuit comprises:

a protective transistor having main electrodes and a control electrode, said main electrodes being coupled respectively to said second rectifier output terminal and said ground terminal;

a voltage divider comprising a series connection of a posistor and a resistor and having input terminals coupled between said second rectifier output terminal and said ground terminal, said voltage divider having an output terminal; and a Zener diode coupled between said output terminal of said voltage divider and said control electrode of said protective transistor to supply base current to said protective transistor at a predetermined high temperature.

* * * * *